Patented Jan. 16, 1951

2,538,397

UNITED STATES PATENT OFFICE 2,538,397

MANUFACTURE OF COATED WATER-VAPOR-PROOF PAPER AND COATING COMPOSITIONS

Alexander Szwarc, Montreal, Quebec, Canada

No Drawing. Application March 6, 1948.
Serial No. 13,519

2 Claims. (Cl. 260—17)

This invention relates to the manufacture of water-vaporproof paper for use as wrappers and in other relations where low water-vapor transmission is an important consideration.

More particularly, the invention consists in applying a coating composition to paper to provide thereon a continuous, flexible, water-vapor resistant film or coating which retains its flexibility at temperatures as low as −20° F.; is characterized by exceptionally low water-vapor transmission; withstands prolonged exposure to weather, fumes and alcohol and provides a satisfactory printing surface.

The water-vapor proofing compound applied to paper in accordance with the invention may be described as a plasticized resin-ethyl cellulose wax compound. It comprises a mixture of coumarone indene resin, ethyl cellulose, rosin and polyisobutene plasticizers, paraffin wax and zinc stearate.

The coumarone indene resin used in the coating compound is a mixture of polymerised coumarone indene resin obtained from solvent naphtha fractions of coal tar at 280° F. to 340° F. This ingredient may comprise from 55% to 65% of the compound.

The ethyl cellulose used in the compound is a cellulose ether formed by treating cellulose with ethyl chloride and caustic alkali and may comprise from 8% to 12% of the compound. It is compatible with the coumarone indene resin in the presence of the plasticizers and serves to improve the water resistance, chemical stability and high impact strength of the coating at normal and sub-zero temperatures.

The rosin plasticizer employed is selected from the class consisting of methyl ester of rosin and hydrogenated methyl ester of rosin and may comprise from 10% to 20% of the compound. This ingredient serves to improve the flexibility of the protective film formed by the coating compound when applied to paper.

The polymer of isobutene plasticizer (low molecular weight grade i. e. from about 0.01 to about 0.05) used in the coating compound is a product of low temperature polymerization of isobutene (also known as isobutylene) using 60% fluoride as a catalyst. This ingredient may comprise from 3% to 6% of the compound. It serves to improve both the moisture-proofness of the coating and the ability of the coating to retain its flexibility at low temperatures.

The paraffin wax used in the coating compound is preferably a solid mixture of purified petroleum hydrocarbons melting at a temperature between 122° F. and 150° F. This ingredient may comprise from 8% to 14% of the compound. It serves to improve the non-tacky quality of the protective film or coating formed by the compound.

The zinc stearate may comprise from 1% to 3% of the compound. This ingredient serves the same purpose as the paraffin wax.

The component ingredients of the coating compound are blended at a temperature which is sufficient to render the resin-ethyl cellulose fluid and to provide a plasticized resin-ethyl cellulose wax compound capable of being readily applied to one or both sides of a base sheet of paper to form thereon a continuous protective film having the flexibility, water repellency, water-vapor resistance and other desirable physical and chemical properties previously referred to.

The invention, as applied to the water-vapor proofing of paper such as glassine and litho-paper, is illustrated by the following specific examples:

EXAMPLE 1

This example serves to illustrate the characteristic physical and chemical properties of 25 lb. glassine coated on one side with a plasticized resin-ethyl cellulose wax compound prepared in accordance with the following formula:

| | Per cent |
|---|---|
| Coumarone indene resin | 62 |
| Ethyl cellulose | 10 |
| Methyl ester of rosin | 12 |
| Polyisobutene | 5 |
| Paraffin wax | 10 |
| Zinc stearate | 1 |

The above ingredients were blended together as previously specified and applied to the paper in a hot melt coating machine at a coating temperature of 375° F. After the surplus coating was doctored off the finished product contained 10% by weight of the coating material.

Test results

| Basis weight: | |
|---|---|
| Plain | 25.9 |
| Coated | 28.7 |
| Mullen per cent | 40 |
| Caliper do | 1.5 |
| Tear do | 34.6:38 |
| Tensile | 9½:11 |
| Bulk | 52 |

Water-vapor transmission measured in grams per 100 square inches per 24 hours per 100° F., 95% R. H. (relative humidity)

| Flat | grams | 1.2 |
|---|---|---|
| Creased | do | 1.4 |

EXAMPLE 2

In this case 25 lb. glassine paper was coated on both sides with the same coating composition as that set forth in Example 1. The coating was carried out in a hot melt coater at a coating temperature of 375° F. and the surplus coating doctored off. The finish product contained 13% by weight of the coating material.

Test results

Basis weight:
  Plain _____ 25
  Coated _____ 28.8
Mullen _____ 42.2
Caliper _____ 1.5
Bulk _____ 52
Tear _____per cent__ 35:38
Tensile _____ 9.5:13

Water-vapor transmission measured in grams per 100 square inches per 24 hours per 100° F., 95% R. H. (relative humidity)

Flat _____gram__ 0.5
Creased _____do____ 0.8

EXAMPLE 3

This example serves to illustrate the characteristic chemical and physical properties of 21 lb. glassine paper coated on one side with a plasticized resin-ethyl cellulose wax compound prepared in accordance with the following formula:

| | Per cent |
|---|---|
| Coumarone indene resin | 62 |
| Ethyl cellulose | 7.5 |
| Hydrogenated methyl ester of rosin | 14 |
| Polyisobutene | 5.5 |
| Paraffin wax | 10 |
| Zinc stearate | 2 |

The paper was coated at a coating temperature of 350° F. and the surplus coating doctored off in a hot melt coater. The finished product contained 9.6% by weight of the coating material on the coated side thereof.

Test results

Basis weight:
  Plain _____ 27.3
  Coated _____ 30.2
Mullen _____per cent__ 48
Caliper _____ 1.4
Bulk _____ 46.7
Tear _____per cent__ 39:35
Tensile _____ 10.5:15

Water-vapor transmission measured in grams per 100 square inches per 24 hours per 100° F., 95% R. H. (relative humidity)

Flat _____gram__ 0.8
Creased _____do____ 0.95

EXAMPLE 4

This example serves to illustrate the characteristic chemical and physical properties of 25 lb. cellulose sheet coated on both sides with a plasticized resin-ethyl cellulose wax compound having the following formula:

| | Per cent |
|---|---|
| Coumarone indene resin | 64 |
| Ethyl cellulose | 10 |
| Methyl ester of rosin | 10 |
| Polyisobutene | 5 |
| Paraffin wax | 10 |
| Zinc stearate | 1 |

The paper was coated at a coating temperature of 375° F. and the surplus coating doctored off in a hot melt coater. The finished product contained 15% by weight of the coating material.

Test results

Basis weight:
  Plain _____ 24.5
  Coated _____ 28.6
Mullen _____per cent__ 65
Caliper _____ 1.5
Bulk _____ 52.5
Tear _____per cent__ 54:51
Tensile _____ 12.5:20

Water-vapor transmission measured in grams per 100 square inches per 24 hours per 100° F., 95% R. H. (relative humidity)

Flat _____gram__ 0.75
Creased _____do____ 0.85

EXAMPLE 5

This example serves to illustrate the characteristic chemical and physical properties of 50 pound litho-paper coated with a plasticized resin-alkyd celluose wax compound having the following formula:

| | Per cent |
|---|---|
| Coumarone indene resin | 65 |
| Ethyl cellulose | 8 |
| Hydrogenated methyl ester of rosin | 1.2 |
| Polyisobutene | 4 |
| Paraffin wax | 8 |
| Zinc stearate | 3 |

The coating was carried out at a coating temperature of 400° F. and the surplus coating removed so that the finished product contained 5% by weight of the coating material.

Test results

Basis weight:
  Plain _____ 53.2
  Coated _____ 56
Mullen _____per cent__ 36
Caliper _____ 3
Bulk _____ 53.5
Tear _____per cent__ 70:64
Tensile _____ 26.5:13

Water-vapor transmission measured in grams per 100 square inches per 24 hours per 100° F., 95% R. H. (relative humidity)

Flat _____grams__ 1.5
Creased _____do____ 3

EXAMPLE 6

In this case the formula set forth in Example 5 was used for coating glassine and cellusine at a coating temperature of 300° F. and the finished products contained 20% by weight of the coating material.

Test results

| | Glassine | Cellusine |
|---|---|---|
| Basis weight: | | |
|   plain | 28.5 | 25 |
|   coated | 35.5 | 31.2 |
| Mullen_____per cent | 38.8 | 57 |
| Caliper | 1.75 | 1.75 |
| Tear | 59:56 | 71:71 |
| Tensile | 16.5:10 | 15:11 |
| Bulk | 49 | 55 |

Water-vapor transmission measured in grams per 100 square inches per 24 hours per 100° F., 95% R. H. (relative humidity)

| | | |
|---|---|---|
| Flat | 0.19 | 0.2 |
| Creased | 0.25 | 0.27 |

Having described the nature of the invention and given various examples of its specific application it will be understood that various modifications may be resorted to within the scope and spirit of the invention as defined by the appended claims.

I claim:

1. As a new article of manufacture, paper provided on one or both sides with a coating compound providing a continuous, flexible, water-vapor resistant film which retains its flexibility at temperatures as low as −20° F.; is characterized by exceptionally low water-vapor transmission, withstands prolonged exposure to weather, fumes and alcohol and provides a satisfactory printing surface, said compound consisting of from 55% to 65% of coumarone indene resin, from 8% to 12% of ethyl cellulose, from 10% to 20% of a rosin ester plasticizer selected from the group consisting of methyl ester of rosin and hydrogenated methyl ester of rosin, from 3% to 6% of a polymer of isobutene plasticizer obtained by low temperature polymerization of isobutene, using fluoride as a catalyst, from 8% to 14% of paraffin wax melting at a temperature between 122° F. and 150° F. and from 1% to 3% zinc stearate.

2. A coating compound of the character described consisting of from 55% to 65% of polymerized coumarone indene resin, from 8% to 12% of ethyl cellulose, from 10% to 20% of a rosin plasticizer selected from the group consisting of methyl ester of rosin and hydrogenated methyl ester of rosin, from 3% to 6% of a polymer of isobutene plasticizer obtained by low temperature polymerization of isobutene, using fluoride as a catalyst, from 8% to 14% of paraffin wax melting at a temperature between 122° F. and 150° F. and from 1% to 3% zinc stearate.

ALEXANDER SZWARC.

REFERENCES CITED

The following references are of record in the file of this patent:

UNITED STATES PATENTS

| Number | Name | Date |
| --- | --- | --- |
| 2,281,940 | Lewis | May 5, 1942 |
| 2,349,571 | Cummins | May 23, 1944 |